United States Patent
Fåhraeus et al.

(10) Patent No.: US 6,529,645 B2
(45) Date of Patent: *Mar. 4, 2003

(54) RECORDING METHOD AND APPARATUS

(75) Inventors: Christer Fåhraeus, Lund (SE); Jan Nilsson, Lund (SE); Patrik Söderlund, Lund (SE)

(73) Assignee: C Technologies AB, Lund (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,856

(22) Filed: Apr. 29, 1999

(65) Prior Publication Data

US 2002/0001418 A1 Jan. 3, 2002

Related U.S. Application Data (63) Continuation of application No. PCT/SE97/01827, filed on Nov. 3, 1997.

(30) Foreign Application Priority Data

Nov. 1, 1996 (SE) ............................................. 9604008

(51) Int. Cl.[7] ................................................. G06K 9/22
(52) U.S. Cl. .................... 382/313; 382/174; 382/284
(58) Field of Search .......................... 382/56, 173, 318, 382/219, 314, 313, 284, 174; 358/450; 345/115, 117, 119, 122, 123

(56) References Cited

U.S. PATENT DOCUMENTS

| | | | | |
|---|---|---|---|---|
| 4,441,205 A | * | 4/1984 | Berkin et al. ................. | 382/18 |
| 4,949,391 A | * | 8/1990 | Faulkerson et al. ........... | 382/56 |
| 5,023,922 A | | 6/1991 | Abramovitz et al. ......... | 382/313 |
| 5,251,268 A | | 10/1993 | Colley et al. ................ | 382/156 |
| 5,280,545 A | * | 1/1994 | Masuda ....................... | 382/318 |
| 5,301,243 A | * | 4/1994 | Olschafskie et al. .......... | 382/59 |
| 5,787,194 A | * | 7/1998 | Yair ............................ | 382/173 |
| 5,812,704 A | * | 9/1998 | Pearson et al. .............. | 382/318 |
| 5,825,924 A | * | 10/1998 | Kobayashi ................... | 382/219 |
| 5,930,411 A | * | 7/1999 | Kojima et al. ............... | 382/318 |
| 6,148,118 A | * | 11/2000 | Murakami et al. ........... | 382/284 |

FOREIGN PATENT DOCUMENTS

| | | | | |
|---|---|---|---|---|
| GB | 2288512 A | 10/1995 | | |
| WO | WO9410653 | 5/1994 | ............ | G06K/9/36 |

* cited by examiner

*Primary Examiner*—Thomas D. Lee
(74) *Attorney, Agent, or Firm*—Cooper & Dunham LLP (57) ABSTRACT

In a method for recording a selected sequence of characters with the aid of a pen, the latter is passed over the sequence of characters and a plurality of images, whose contents partially overlap, are recorded simultaneously with the aid of a light-sensitive sensor (8) with a two-dimensional sensor surface. The recorded images are put together, horizontally as well as vertically, into an image. Subsequently, the characters in the composite image are identified and stored in the pen with the aid of a predetermined character code formal. The putting-together, the character identification, and the storing are carried out with the aid of a signal processing unit (20–24). By the method and the pen compensation is obtained for different speeds of movement and different angles of rotation of the pen.

18 Claims, 5 Drawing Sheets

Flygande bäckasiner FIG.4a

Fl | Fl | lyg | gar | nde | b | bäc | ck | as | sin | ne | er

FIG. 5b

*Flygande bäckasiner*

FIG. 5c

Flygande bäckasiner

FIG. 6a

Flygande bäckasiner
FIG. 6b

Flygande bäckasiner
FIG. 6c

RECORDING METHOD AND APPARATUS

This application is a continuation of PCT International Application No. PCT/SE97/01827 filed Nov. 3, 1997, designating the United States of America, which claims priority of Swedish Patent Application No. 9604008-4 filed Nov. 1, 1996. The contents of these prior applications are incorporated in their entireties into the present application.

FIELD OF THE INVENTION

The present invention relates to a pen for recording a selected sequence of characters according to the preamble of claim 1, as well as a method for effecting such a recording according to the preamble of claim 7.

BACKGROUND OF THE INVENTION

A reader who reads a text often wishes to mark the most important sections of the text in order to be able to easily find them when next reading through the text, thereby avoiding having to read irrelevant parts of the text. It is known to use so-called highlighter pens for this purpose.

A reader may also need to put together selected parts of a text into a new document, which can be edited in a word-processing program in a computer. A known method for feeding text into a computer is to use a scanner. There are stationary scanners and portable scanners. A stationary scanner is used to scan whole pages of text, the scanner being passed over the text automatically at a constant speed. This type of scanner is not suitable for scanning selected parts of a text on a page. A portable scanner, on the other hand, can be used for this purpose.

U.S. Pat. No. 5,301,243 discloses a handheld scanner for reading characters from a character string on a substrate. The scanner, which is passed over the characters which are to be read in contact with the substrate, has an optical system which "sees" a small part of the substrate. The optical system comprises a CCD type line sensor, which has a plurality of light-sensitive elements arranged in a row. When the scanner is passed over the characters on the substrate, a sequence of vertical "slices" of the characters and of the spaces between them is recorded. The "slices" are stored in the scanner as a digital bitmap. Subsequently, OCR software (OCR=Optical Character Recognition) is used to identify the scanned characters and to store them in character-coded format, e.g. with the aid of ASCII code, in a memory. The character recognition can be performed either in the scanner or in an external computer to which the bitmapped characters have been transferred.

A problem associated with the use of portable scanners is that the scanner has to know the distance between the scanned "slices" in order to be able to identify the characters correctly. This means that the scanner either has to be passed over the characters at a constant speed, which is very difficult to achieve manually, or else contain a very accurate distance meter.

In the above-mentioned U.S. Pat. No. 5,301,243, the distance problem is obviated with the aid of a mechanical distance meter in the form of a wheel. However, a mechanical distance meter comprises moving parts, which is a drawback as far as durability and manufacturing are concerned. Moreover, the distance meter makes it difficult to record information from a newspaper or the like if the latter is not placed on a hard surface. In addition, the distance meter impairs the possibility of seeing the information which is to be recorded, since the wheel has to abut against the surface from which the information is to be recorded and consequently makes the end of the scanner which abuts against the surface bulkier.

A further problem connected with known portable scanners is that they must be held orientated substantially in one and the same predetermined direction the whole time. More specifically, the sensor must be orientated perpendicular to the direction in which the pen is being moved, i.e. perpendicular to the character sequence. If a scanner is held in another direction or is rotated around its longitudinal axis while a sequence of characters is being recorded, the scanner may have difficulty identifying the characters recorded, since there is no directional information in the scanned "slices". This is a serious drawback of the prior art since different individuals often hold a scanner in different ways. In particular, there is a difference in the way right-handed and left-handed individuals hold scanners. Furthermore, an individual often changes the position of his hands as the scanner moves along a line. This is a particular problem when one is holding a book or the like in one's hand and wishes to record text.

U.S. Pat. No. 4,949,391 discloses an optical scanner with no distance meter. More specifically, this optical scanner comprises a two-dimensional sensor, which records images with partially overlapping contents of a text over which the scanner is passed. However, the handheld scanner is really only an "unintelligent" recording unit which records characters without interpreting them. Instead, the OCR processing is carried out in a computer to which the scanner is connected. The scanner correlates with each other images recorded one after another in order to remove columns with redundant information from the images so that they will require less storage space. The scanner can only be moved in a predetermined direction which is defined by a wheel.

SUMMARY OF THE INVENTION

One object of the invention is to obviate, or at least reduce, the problems described above of the prior art for portable scanners, and specifically to provide a method and a pen which can be used for recording a selected sequence of characters without the aid of a distance meter and with no requirement of a constant speed of movement.

In this connection, a further object is to provide such a method and such a pen which can be held rotated in different ways around its longitudinal axis and which specifically allows the pen to be rotated around its longitudinal axis while a selected sequence of characters is being recorded, without the reliability of the identification of recorded characters being reduced in a decisive manner.

The objects are achieved by a pen and a method for recording a selected character sequence which have the features stated in claims 1 and 7, respectively.

As mentioned above, the pen and the method according to the invention are used for recording a selected sequence of characters by passing the pen over the character sequence. The sequence selected can, for example, consist of one or several words or one or several sentences selected from a longer text. The characters can be letters, numbers and or other written characters or symbols. The characters can be scanned from a paper or another medium, which can be scanned optically.

The pen comprises a light-sensitive sensor with a two-dimensional sensor surface. In this context, a two-dimensional sensor surface refers to a sensor surface which can record more than one pixel in two directions perpendicular to one another. The sensor is preferably of the CCD type. It can record two-dimensional images in grey scale or in colour. The images consist of a plurality of pixels, each being defined by an intensity value. The height of the images should be such that there is essentially room in the image for the highest character which is to be recorded. The width of the images can be chosen on the basis of the image-recording frequency desired and available sensors.

Furthermore, the pen comprises a signal processing unit which should contain at least a central processing unit, a memory, input/output circuits, and program instructions for implementation of the method according to the invention. The signal processing unit preferably comprises a suitably programmed microprocessor. The signal processing unit employs the partially overlapping contents of the images to put the recorded images together into one image. The putting-together is done both vertically and horizontally so that the vertical as well as the horizontal directional information in the images is utilised. As a result, there is no duplication of the contents in the composite image.

When an image has been put together, the signal processing unit identifies the characters in the image and stores them in character-coded format in a memory in the pen. This means that the pen is of the stand-alone type. However, it is suitably connectable to an external computer, so that the information can be transferred to the latter. A composite image preferably has a predetermined maximum length. In order to increase the speed and reduce the memory requirement for images which have been recorded but not yet put together, the putting-together is suitably carried out sequentially as the images are being recorded. Thus, the fact that the putting-together can be performed in real time reduces the memory requirement for recorded images. The putting-together normally continues until all recorded images have been put together. However, it is interrupted if the predetermined maximum length of the composite image is reached. Alternatively, the putting-together can be carried out after the recording is complete, in which case a predetermined maximum number of images car be recorded, which are subsequently put together into -an image. The pen can have an indicating device for indicating that it is ready to resume recording.

By using a sensor with a two-dimensional sensor surface, by means of which images with partially overlapping contents can be recorded, and by putting together the images into one image, it is possible to eliminate the requirement of a constant movement speed or of the provision of a distance meter. By virtue of the contents of the images partially overlapping, the images will themselves contain information about their relative position, i.e. distance information, and as a result there is no need to record this information using a distance meter. Moreover, the user can hold the pen at an optional angle of rotation in relation to the text and can even rotate the pen while recording the images without impairing the character identification, since the overlapping images contain directional information, which indicates their relative position. This considerably improves user-friendliness.

Preferably, the pen has a display, so that the user can read the recorded character sequence without first having to transfer it to an ordinary computer.

As mentioned above, in order for it to be possible to carry out the putting-together, there has to be a certain overlapping of the contents of the recorded images. The degree of overlapping should preferably be greater than 20%, preferably greater than 50%.

To make the contrast in the recorded images sufficiently great and to avoid blurriness caused by the pen being moved in relation to the character sequence, the characters which are to be recorded are preferably illuminated by light pulses when the pen is being passed over the character sequence. The illumination can suitably be achieved with the aid of illumination means, e.g. an LED, which is fitted in or to the apparatus. The frequency of the light pulses should be the same as and be synchronised with the frequency for recording images, i.e. the frequency for reading the contents of the light-sensitive sensor. A fast mechanical shutter, for example, could be used instead of the pulsed illumination. However, this results in a more complicated apparatus.

When the images are being put together, images recorded one after another are preferably examined in pairs with respect to possible overlap positions for determining the overlap position which affords the best correspondence between the contents of each pair. The overlap position determined in this manner is used when putting together the images of the pair.

When the best overlap position has been determined, a pixel intensity value is preferably determined for each overlapping pixel. This pixel intensity value is based on the intensity values of the pixel in question in the images of the pair. The pixel intensity values determined in this manner are used in the final composite image.

When the whole image has been put together, the image is preferably divided into a plurality of subimages each comprising a character. This division, which thus does not have to be a physical division but rather can be performed in the whole image, constitutes a preparation for the actual character recognition, each character preferably being interpreted separately. Alternatively, whole words or parts thereof could be interpreted.

The division of the image into sub-images can be effected by the intensity of the pixels being added up row by row and column by column in the composite image in order to obtain a plurality of row sums and a plurality of column sums and by local minima being identified among the row sums and column sums obtained.

The identification of the characters in the composite image is advantageously effected with the aid of a neural network.

Suitably, in this connection, the intensity value of each pixel in a sub-image is determined and is fed as an input signal to the neural network, which is adapted to identify the character in said sub-image with the aid of the input signals.

Prior to the identification of the characters, the composite image can be rotated if necessary so that the characters in the image form a horizontal row. This facilitates the identification.

The pen according to the invention can for example be employed to record text while studying, to scan numerical values, to compose new documents on the basis of old documents which exist in paper form only, and for many other applications.

BRIEF DESCRIPTION OF THE DRAWINGS

The present invention will be described below by way of an example which illustrates how the invention can be realised and used. The description refers to the accompanying drawings, in which FIG. 1 schematically shows an embodiment of a highlighter pen according to the invention.

DESCRIPTION OF A PREFERRED EMBODIMENTS

Figure 1:
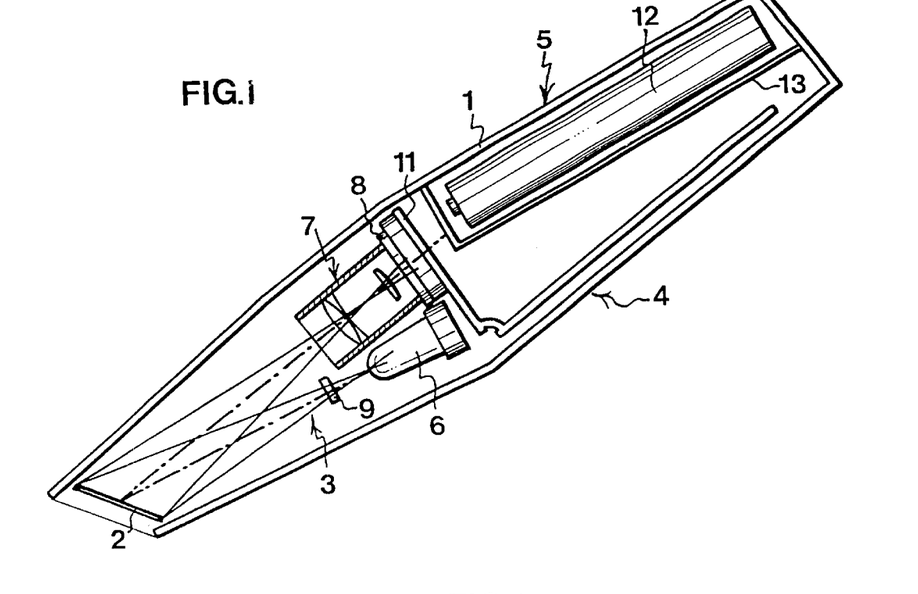

In the embodiment of the pen according to the invention shown in FIG. 1, it has a casing 1 with approximately the same shape as a conventional highlighter pen. One short end of the casing 1 has a window 2, which is intended to abut against or be held a short distance from a storage medium, usually a sheet of paper, from which characters are to be recorded. The width of the window 2 is chosen on the basis of the desired image-recording frequency, the desired maximum traction speed and available sensors. The height of the window 2 is somewhat greater that the highest character which is to be recorded. The window 2 forms an acute angle with the longitudinal axis of the pen, so that the user is guided to hold the pen at a predetermined angle to the sheet of paper. Moreover, the window is somewhat retracted into the casing so that it will not wear against the paper.

The casing 1 essentially contains an optical part 3, an electronic part 4 and a power supply 5.

The optical part 3 comprises an LED 6, a lens system 7 and a light-sensitive sensor 8 which constitutes an interface to the electronic part 4.

The LED 6 has the task of illuminating the part of the storage medium which is currently under the window. A diffuser 9 is mounted in front of the LED 6 to diffuse the light.

The task of the lens system 7 is to project an image of the part of the storage medium which is located under the window 2 of the light-sensitive sensor 8 as accurately as possible. If the sensor 8 has a smaller light-sensitive area than the window 2, the lens system 7 must also reduce the image. The skilled person will be able to construct a number of different lens systems to fulfil this purpose.

In this example, the light-sensitive sensor 8 consists of a two-dimensional square CCD unit (CCD=charge coupled device) with a built-in A/D converter. Such sensors are commercially available. Here, the sensor 8 is mounted at a small angle to the window 2 and on its own printed circuit board 11.

The power supply to the pen is obtained from a battery 12 which is mounted in a separate compartment 13 in the casing.

Figure 2:
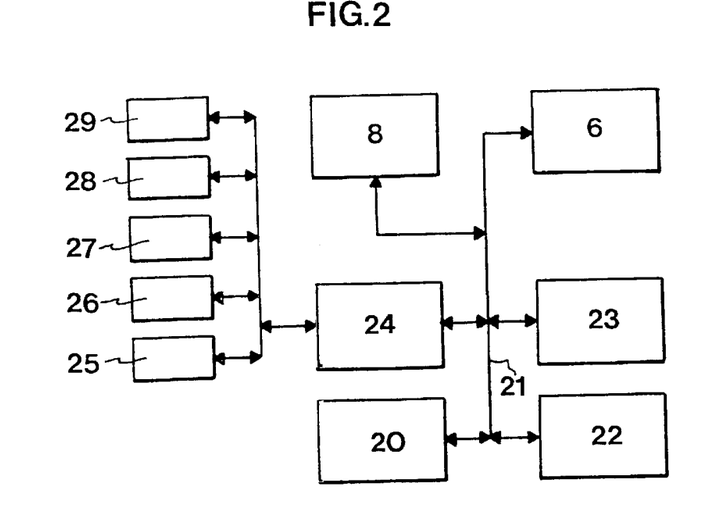
FIG. 2 is a block diagram of the electronic circuitry in an embodiment of the highlighter pen according to the invention.

The block diagram in FIG. 2 schematically shows the electronic part 4. It comprises a processor 20, which by the intermediary of a bus 21 is connected to a ROM 22, in which the programs of the processor are stored, to a read/write memory 23, which constitutes the working memory of the processor and in which the images from the sensor as well as the identified and interpreted characters are stored, to a control logic unit 24, as well as to the sensor 8 and to the LED 6. The control logic unit 24 in turn is connected to a number of peripheral units, which comprise a display 2, which is mounted in the casing, an IR transceiver 26 for transferring information to/from an external computer, buttons 27, by means of which the user can control the apparatus, a tracer LED 28 which emits a light beam which makes it easier for the user to follow the text, and an indicating device 29, e.g. an LED, indicating that the pen is ready to record characters. Control signals to the memories, the sensor, and the peripheral units are generated in the control logic unit 24. The control logic unit also handles generation and prioritisation of interruptions to the processor. The buttons 27, the IR transceiver 26, the display 25 and the tracer LED 28, and the LED 6 are accessed by the processor writing and reading in the register in the control logic unit. The buttons 27 generate interruptions to the processor 20 when they are activated.

The pen works as follows. A user holds the pen against a sheet of paper with text in the location where he wishes to start recording a character sequence. He pushes a button 27 to activate the pen and passes the latter over the text he wishes to record, following the text in the same way as when one reads a text. The tracer LED 28 emits a light beam which facilitates following the lines. When the user activates the pen, the processor 20 commands the LED 6 to begin generating strobe pulses at a predetermined frequency of 25 Hz, the images recorded by the sensor being stored in the read/write memory 23 at the same frequency. However, text which is stored in the form of images requires a large amount of memory space and cannot immediately be used by a computer in, for example, a word-processing program. Consequently, the characters in the images are identified and stored with the aid of ASCII code. When the user has passed the pen over a selected sequence of characters or has come to the end of a line, he lifts the pen from the paper and releases the activating button, whereby the processor 20 turns off the LED 6. When the selected character sequences have been recorded, the user can control the pen to show recorded text on the display 25 or to transfer the text to an external computer by the intermediary of the IR transceiver 12. The possibility of showing the scanned character information directly on the display has proven very essential since a user often wishes to verify that the right character has been scanned.

Figure 3:
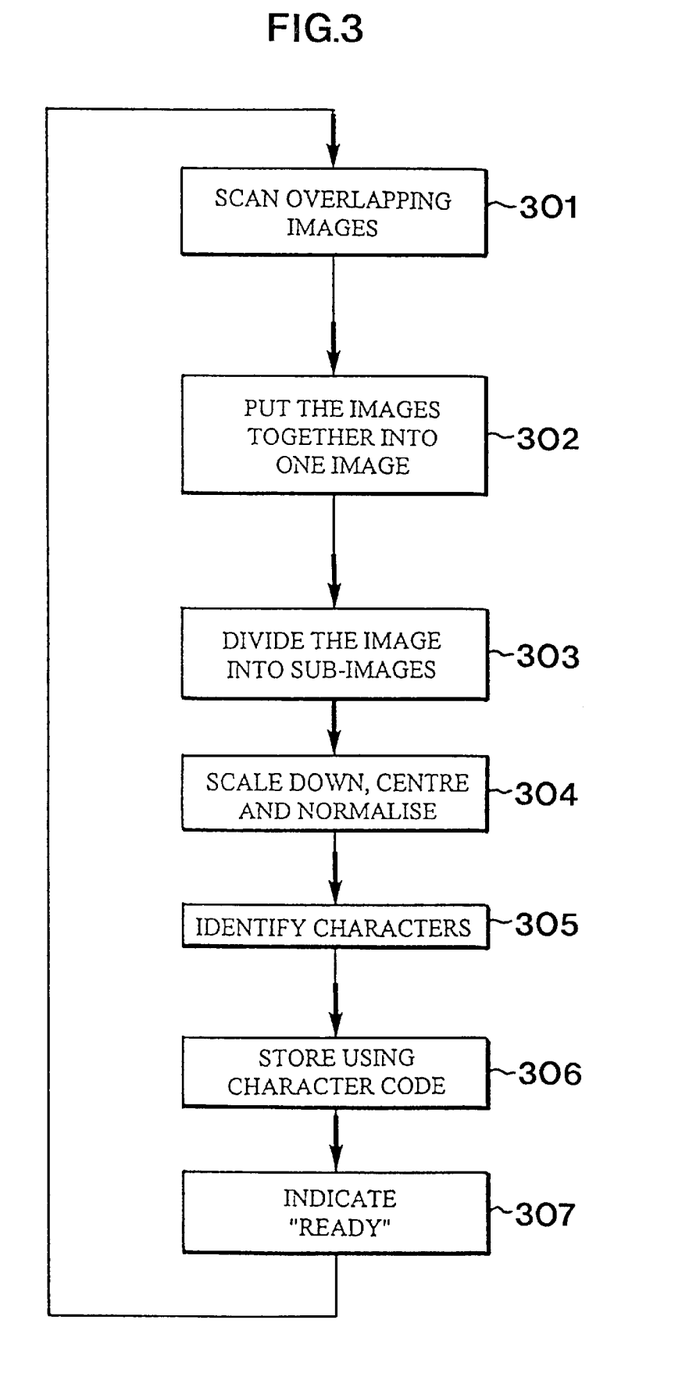
FIG. 3 is a flowchart and shows an implementation of the method according to the invention.

The flowchart in FIG. 3 shows an implementation of the method according to the invention. In step 301, images with overlapping contents are scanned with the aid of the pen described above and are stored in a current image area in the read/write memory 23. The images are stored as images, i.e. with the aid of a plurality of pixels, each having a grey scale value in a range from white to black.

As soon as a whole picture is stored in the current image area, the putting-together of the image with the previous image is suitably commenced, step 302, if such an image is available. If there is no previous image, the current image is entered directly into a line image area in the read/write memory.

In order to determine how the current image is to be put together with the previous image so that the best correspondence is achieved between the contents of the images, every possible overlap position between the images is examined, at the pixel level, and an overlap measurement is determined as follows:

1) For each overlapping pixel position, the grey scale values of the two pixels included are added up if the latter are not white. A pixel position in which none of the pixels are white is designated a plus position.
2) The grey scale sums for all the plus positions are added up.
3) The neighbours of each pixel position are examined. If an overlapping pixel position is not a neighbour of a plus position and consists of a pixel which is white and a pixel position which is not white, the grey scale value of the non-white pixel is subtracted, possibly multiplied by a constant, from the sum in point 2).

4) The overlap position which provides the highest overlap measurement as stated above is selected. In the resulting composite image the mean value of the grey scale value of the overlapping pixels is used. In this way, noise can be suppressed in the overlap area. The putting-together is thus carried out both vertically and horizontally. If it is detected that, when being put together, the images do not end up on a horizontal line, the composite image is suitably adjusted so that it becomes horizontal, for example by rotating the composite image.

The composite image gradually develops in the line image area in the read/write memory. It is preferred that the line image area be big enough to store an A4 line of normal typewritten text.

In step 303, the software of the processor 20 divides the composite image in the line image memory area into sub-images each containing only one character. The purpose of this is to create input signals to a neural network software which is to interpret the characters. The division is effected by adding up the grey scale values of the pixels for each pixel row and each pixel column in the composite image. By studying the local intensity minima for the row sums and column sums obtained, boundaries for the extent of each character in the image can be determined.

If the composite image contains more than one line of text, which may be the case if the text is small, the lines of text must be separated and the line in question must be selected before the division into sub-images is carried out. The separation can be performed using a technique like the one used for the division into sub-images.

In step 304, each of the sub-images is scaled down to a predetermined pixel format by the sub-image being divided into groups of pixels, each being replaced by a pixel whose grey scale value corresponds to the mean value of the grey scale values of the pixels included in the group. If required, a like downscaling can be carried out between other steps in the method according to the invention. Further, the character is centred with respect to its point of balance and the grey scale values are normalised so that the sum of the square of the grey scale value of each pixel is given a fixed value.

Subsequently, in step 305, each character in the composite image of the character sequence depicted is interpreted. The grey scale values of the pixels which together constitute a sub-image containing only one character are fed as input signals to a neural network. Each output from the neural network represents a character which the network can identify. The output from the network which has the highest output signal is chosen and the character thus chosen is stored in step 306 using a predetermined character code format, for example ASCII code, in the read/write memory 23 in a memory area for interpreted characters. When the character identification and storing in character-coded format is completed, the processor activates the indicating device 29 to inform the user that it is ready to record a new character sequence, step 307. Subsequently, it goes back to step 301.

The steps described above are thus carried out by the processor 20 with the aid of the associated units and suitable software. Such software can be created by the skilled person with the aid of the above instructions. The character recognition is performed with the aid of neural network software, which is trained in a suitable manner. Neural network software is commercially available from, for example, MAT-LAB Neural Network Toolbox, The MathWorks Inc., 24 Prime Park Way, Natick, Mass. 01760, USA.

Figure 4A:
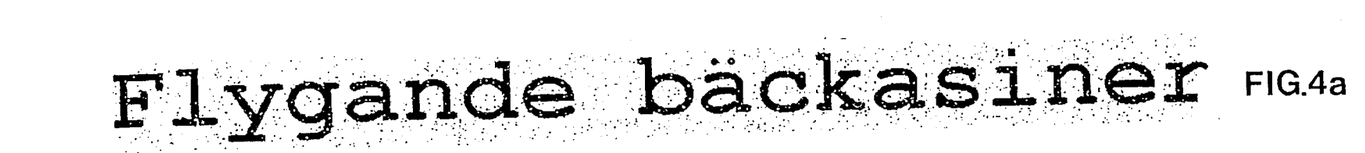
FIGS. 4a–4e illustrate an example of an implementation of the method according to the invention.
Figure 4B:
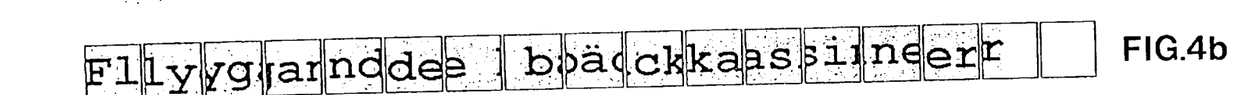
Figure 4C:
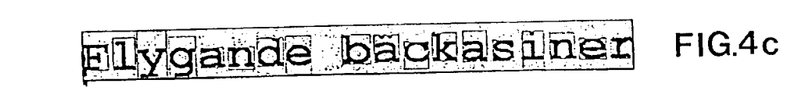
Figure 4D:
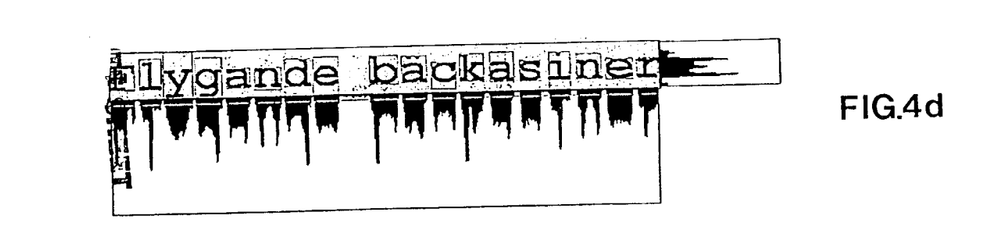
Figure 4E:
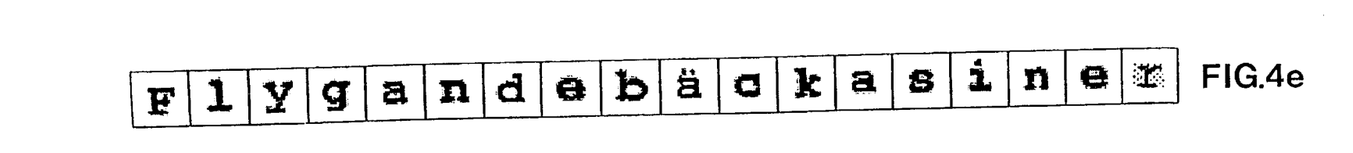

FIGS. 4*a*–4*e* illustrate how the method according to the invention works when the character sequence "Flygande b äckasiner" (a Swedish phase meaning 'Flying snipes') is scanned. FIG. 4*a* shows the text on a sheet of paper, which also has a certain amount of "dot noise" in the form of small black spots. FIG. 4*b* shows the images which are being recorded with the aid of the sensor. As can be seen from this figure, the contents of the images partially overlap. The letter 1 appears completely in image No. 1 and partially in image No. 2. The degree of overlapping depends on the traction speed, i.e. the speed with which the user pulls the apparatus over the text in relation to the frequency with which the contents of the sensor are read out. FIG. 4*c* shows what the whole composite image looks like. Note that the image is still stored in the form of pixels. FIG. 4*d* illustrates the division of the whole image into sub-images. FIG. 4*e* shows the scaled and normalised letters which are used as input signals to the neural network. When the method has been implemented the text "Flygande backasiner" is stored in the read/write memory of the pen as ACSII code.

Figures 5A, 5B:
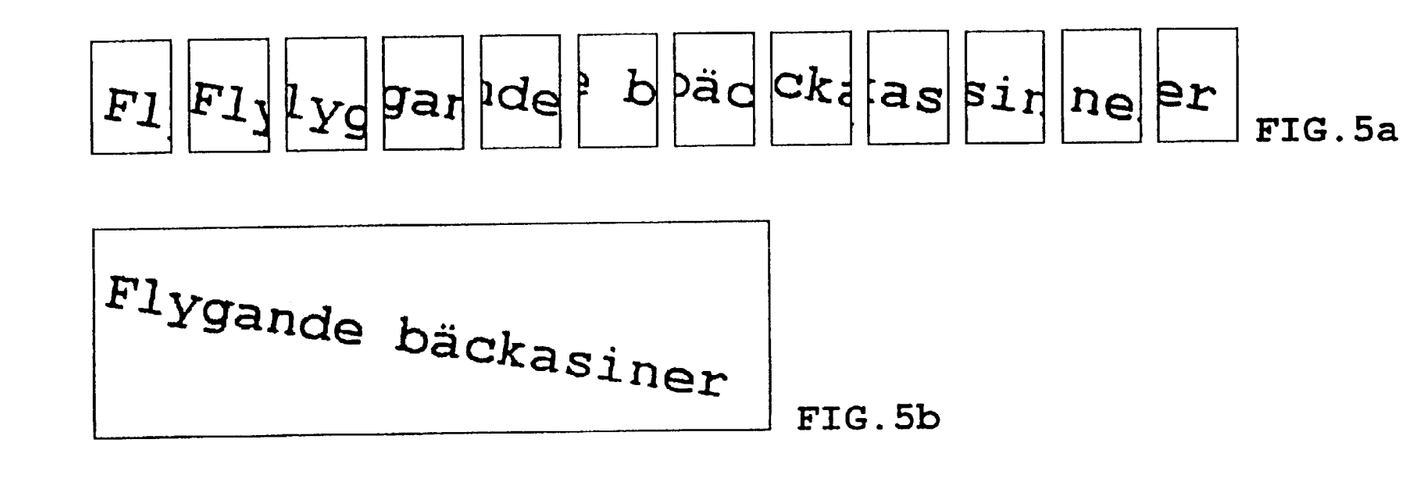
FIGS. 5a–5c illustrate another example of an implementation of the method according to the invention.
Figure 5C:
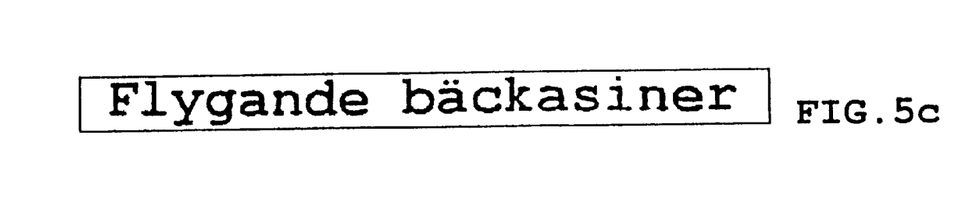

In the example shown, the pen was held straight and was not rotated at all while the character sequence was being recorded. If the pen had been held rotated at a constant angle around its longitudinal axis, the images would instead have looked like the ones in FIG. 5*a*. In this case, when the images are put together a slanting image is obtained, see FIG. 5*b,* which has to be rotated in order for the character sequence to be horizontal, FIG. 5*c*. In order to determine how great a rotation is to be performed, the position of the characters in the composite image is detected in a couple of places.

Figure 6A:
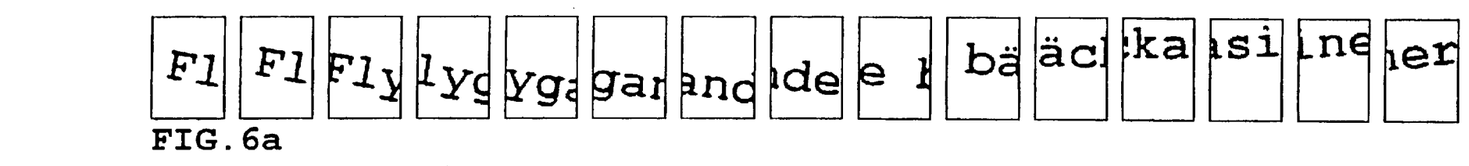
FIGS. 6a–6c illustrate a further example of an implementation of the method according to the invention.
Figure 6B:
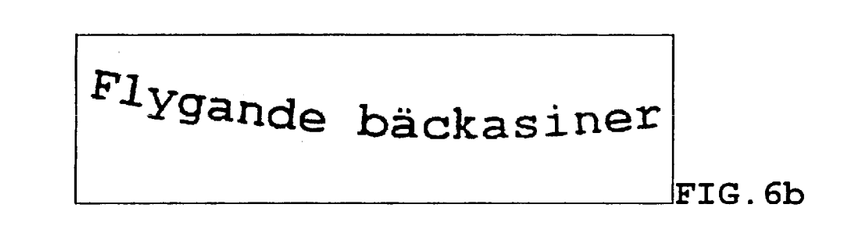
Figure 6C:
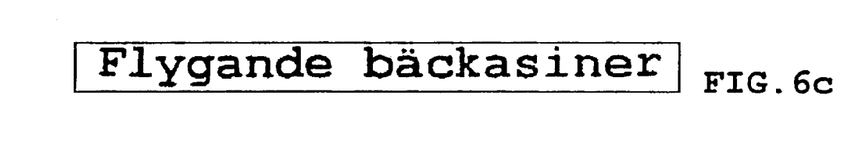

If the pen is rotated around its longitudinal axis at the time of recording, the inclination of the images will be different. An example of this is shown in FIG. 6*a*. When the images are put together, see FIG. 6*b,* a wave-shaped character sequence is obtained. It can be straightened out to a horizontal line by the position of the characters in the composite image being detected in a plurality of locations and by different segments being rotated to different extents (see FIG. 6*c*).

What is claimed is:

1. A method for recording a selected sequence of characters with the aid of a portable scanner, comprising the steps of:

passing the portable scanner over a selected character sequence;

imaging the selected character sequence by means of a plurality of images, whereby the content of a second image partly overlaps the content of at least one preceding first image;

for every possible overlap position between the second and first images, an overlap measurement is determined at the pixel level;

for each overlapping pixel position, the grey scale values of the two pixels included are added up if the latter are not white, whereby a pixel position in which none of the pixels are white is designated a plus position;

the greyscale sums for all the plus positions are added up to a grand greyscale sum;

the neighbors of each pixel position are examined and if an overlapping pixel position is not a neighbor of a plus position and consists of a pixel which is white and a pixel position which is not white, the greyscale value of the non-white pixel is subtracted from the grand greyscale sum;

selecting the overlap position which provides the highest grand greyscale sum;

combining the second and first images by means of said overlap position for generating a composite image from said second and first images;

identifying the characters in the composite image; and storing the identified characters in the portable scanner with the aid of a predetermined character code format.

2. A method according to claim 1, further comprising the step of:

illuminating the characters which are to be recorded with light pulses, when the portable scanner is being passed over them.

3. A method according to claim 1, wherein the portable scanner comprises a pen shape.

4. A method according to claim 1, wherein said non-white pixel value is multiplied by a constant, before being added to the grand greyscale sum.

5. A method according to claim 1, wherein the combining of the recorded images is carried out in real time.

6. A method according to claim 1, wherein the step of identifying the characters comprises dividing the composite image into a plurality of sub-images each comprising a single character.

7. A method according to claim 1, wherein the composite image consists of a plurality of pixels, each being defined by an intensity value, and wherein the step of dividing the composite image into a plurality of sub-images comprises adding up the intensity of the pixels row by row and column by column in the composite image for obtaining a plurality of row sums and column sums as well as identifying local minima among the row sums and column sums obtained for dividing the composite image into sub-images.

8. A method according to claim 1, further comprising the step of, prior to the identification of the characters, rotating the composite image so that the characters in said image form a horizontal row.

9. A method according to claim 1, wherein the portable scanner comprises an indicating device for indicating that the pen is ready to scan the character sequence.

10. A method according to claim 1, wherein the portable scanner comprises a display for showing the identified characters.

11. A method for recording a selected sequence characters with the aid of a portable scanner, comprising the steps of:

passing the portable scanner over a selected character sequence;

imaging the selected character sequence by means of a plurality of images, such that the content of a second image partly overlaps the content of at least one preceding first image;

for each overlapping pixel position, the grey scale values of the two pixels included are added up if the latter are not white, whereby a pixel position in which none of the pixels are white is designated a plus position;

the greyscale sums for all the plus positions are added up to a grand greyscale sum;

the neighbors of each pixel position are examined and if an overlapping pixel position is not a neighbor of a plus position and consists of a pixel which is white and a pixel position which is not white, the greyscale value of the non-white pixel is subtracted from the grand greyscale sum; and selecting one overlap position which provides the highest grand greyscale sum;

combining the second and first images by means of said overlap position such that a composite image is generated from said second and first images and such that compensation is obtained for different speeds of movement and different angles of rotation of the pen;

determining a pixel intensity value in said composite image for each overlapping pixel, which composite pixel intensity value is based on the intensity values of the pixel in the second and first images;

identifying the characters in the composite image; and storing the identified characters in the portable scanner with the aid of a predetermined character code format.

12. A method according to claim 11, wherein said composite pixel intensity value is the mean value of the intensity values of the pixel in the second and first images.

13. A method according to claim 11, wherein said non-white pixel value is multiplied by a constant, before being added to the grand greyscale sum.

14. A method according to claim 11, wherein the combining of the recorded images is carried out in real time.

15. A method according to claim 11, wherein the step of identifying the characters comprises dividing the composite image into a plurality of sub-images each comprising a single character.

16. A method according to claim 15, wherein the composite image consists of a plurality of pixels, each being defined by an intensity value, and wherein the step of dividing the composite image into a plurality of sub-images comprises adding up the intensity of the pixels row by row and column by column in the composite image for obtaining a plurality of row sums and column sums as well as identifying local minima among the row sums and column sums obtained for dividing the composite image into sub-images.

17. A method according to claim 15, further comprising the step of, prior to the identification of the characters, rotating the composite image so that the characters in said image form a horizontal row.

18. A method according to claim 11, further comprising the steps of:

examining said second image with respect to possible overlap positions with said first image with the aid of the overlapping content only, vertically, horizontally and rotationally;

determining an overlap position which affords the best correspondence between the contents of said second and first images.

* * * * *